July 4, 1939.   V. WEBER   2,165,082
PROTECTED MOTOR
Filed Aug. 1, 1936
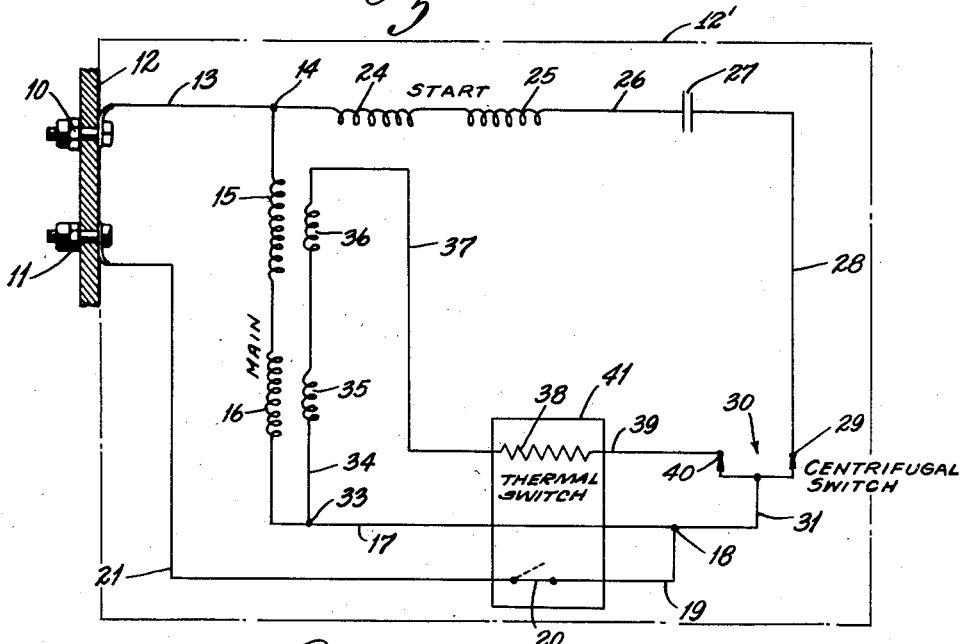
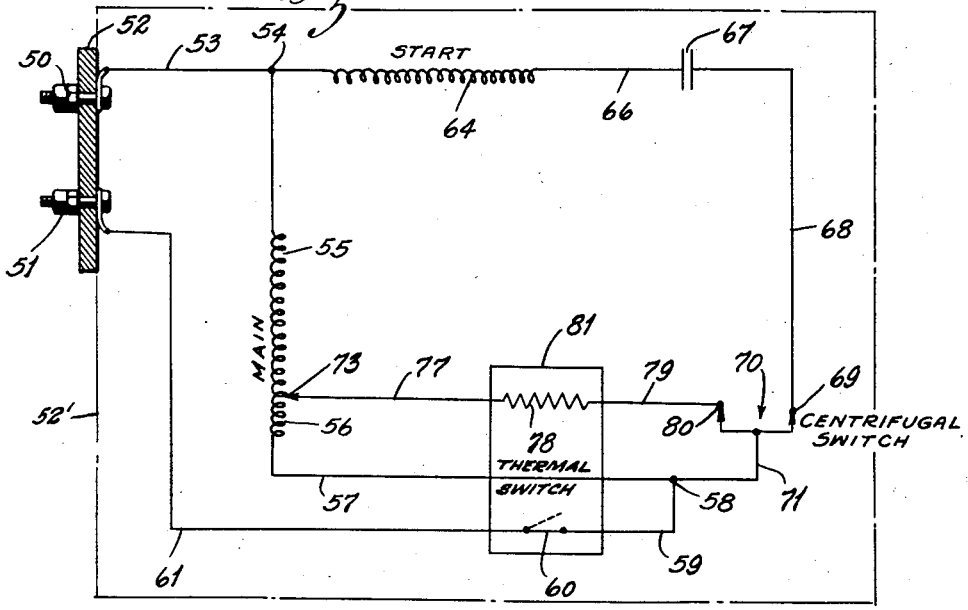
INVENTOR
VICTOR WEBER,
By Lawrence McKingsland
ATTORNEY Patented July 4, 1939

2,165,082

UNITED STATES PATENT OFFICE 2,165,082

PROTECTED MOTOR

Victor Weber, St. Louis, Mo., assignor to The Emerson Electric Mfg. Co., St. Louis, Mo., a corporation of Missouri Application August 1, 1936, Serial No. 93,794

2 Claims. (Cl. 172—279)

The present invention relates to a combination of electrical energy-translating devices, and means to deenergize the same upon occurrence of excess current or heat therein. As a particular application to which it is especially adaptable, the combination can comprise an electric motor and a thermally actuated switch mounted within the motor casing and opened when the heat produced in the motor exceeds a predetermined limit, the heat being generated by sudden excess of currents within the motor windings acting upon a heater element in the switch, or by gradual accumulation of heat in the windings.

An object of the present invention is to provide a motor having a thermally-actuatable circuit breaker mounted within the motor casing and operatively connected therewith to control energization of the motor.

Another object is to provide a motor having a thermally-actuatable circuit breaker and an associated heater element operatively connected therewith to break the line circuit, either upon a predeterminately excessive current in the windings, or upon undue rise of heat in the motor casing.

Another object is to provide a motor having a thermally-actuatable circuit breaker and associated heater element connected therewith to protect the windings during starting from an excessive current.

Another object is to provide a multiple winding motor having a heater element connected in transformer relation to the main windings, and disposed in heat-transferring relation to a thermally-actuatable circuit breaker controlling the energization of the motor.

Another object is to provide a multiple windings motor having a heater element connected in auto-transformer relation to the main windings, and disposed in heat-transferring relation to a thermally-actuatable circuit breaker controlling the energization of the motor.

Other objects and advantages will appear from the following description, taken in conjunction with the accompanying drawing, in which—

Fig. 1 is a diagrammatic view of the combination of motor windings and the thermal switch circuit with its associated heater element.

Fig. 2 is a similar view with a somewhat different heater element circuit.

In the modification shown in Fig. 1, the line terminals of the motor are indicated at 10 and 11, they being on a suitable part of the motor casing 12. The remainder of the motor casing is represented by the broken line 12' which surrounds the to be described elements, thereby indicating said elements are within the motor casing 12. Within the motor casing are the conventional main and starting windings, as shown. From the terminal member 10 extends a lead 13 that divides at 14 into the parallel main and starting windings. The main circuit is shown as having two pole windings 15 and 16, they being in series. From an end of the winding 16 extends a line 17 to a junction 18. From this junction a line 19 extends to a switch 20, from which switch extends a line 21 to the other motor terminal 11.

The starting winding likewise comprises two pole coils 24 and 25 that are connected in series from the junction 14. From an end of the coil 25, a lead 26 extends to a condenser 27 ordinarily used in such circuits. From this condenser, a line 28 extends to a pole 29 of a two-pole centrifugal switch 30. From switch 30, a line 31 extends to the junction 18 so that the starting circuit is shown to be in parallel with the main circuit.

From a suitable point, as 33, in the line of the main windings, is tapped off a lead 34 extending to a two-pole secondary having windings 35 and 36 located in inductive relationship to the main pole windings 16 and 15, respectively. From the winding 36 extends a lead 37 to a heater coil 38. From the heater coil 38, a line 39 connects to the other pole 40 of the centrifugal switch. It will be understood that the switch 20 is a thermal switch that opens automatically when the temperature reaches a predetermined value. Such a switch is shown in my copending application Serial No. 86,991, filed June 24, 1936. The heating element 38 is in heating relationship with the thermal element of the switch. This is indicated by the backing element 41 upon which both the heater 38 and the switch 20 are mounted.

The operation of this device is as follows: When the motor circuit is turned on with potential supplied to the terminals 10 and 11, current will flow through the lead 13 to the junction 14, at which point it divides into the main and the starting circuits. It is to be understood that the starting windings are mechanically phase-displaced from the main windings so as to produce a starting torque within the motor. The current from the starting windings flows through the centrifugal switch 30 and joins with that in the main windings at the junction 18, whence it flows by way of the thermal switch 20 back out at the terminal 11. As the motor is starting, owing to the low back E. M. F. within the main windings, there is a relatively high current flowing through them, with the result that, in the secondary windings 35 and 36, there is a high induced E. M. F. and consequently a large current flowing through the heater 38. If the motor gets up to speed with normal rapidity, the duration of this high current in the heater is insufficient to open the switch. In normal operation of the motor, the centrifugal switch 30 will open as soon as the motor attains the desired speed, so that the starting windings and the heater circuit are opened. At this time, only the main windings will then be energized. However, if, for any reason, an excess current flows through the main windings, such as would be caused by overload on the motor slowing it down, but not to the speed at which the centrifugal switch operates, the back E. M. F. within the main windings 15 and 16 will be greatly reduced, since, under these conditions, the rotor windings are ineffective to produce such a back E. M. F. When this occurs, a large current will flow in the main windings. If this current accumulates sufficient heat by flowing for an extending period of time, a quantity of heat might be generated within the windings and motor casing sufficient to be dangerous to the winding. However, with the present arrangement of the switch within the motor casing, the heater element will respond to this heat and open the switch 20, thus shutting down the motor.

If the motor is blocked, the centrifugal switch will close, closing the heater circuit. When this occurs, the large current flowing through the main windings produces a correspondingly high secondary E. M. F. within the windings 35 and 36. The high current produced in the secondary windings will flow through the heating coil 38 to the terminal 40 of the centrifugal switch; thence through the line 31 to the junction 18;
and back by way of line 17, junction 33 and lead 34 into the secondary windings. The heater will then rise in temperature, and act on the switch 20 to open the same, in a very short time. It is, of course, understood that the characteristics of the secondary circuit are out of phase with those of the main windings. Furthermore, they are so much smaller in value than those of the main circuit that they do not materially affect the latter.
In the present description, it will be observed that the secondary winding has been divided into the same number of parts as the primary, namely, a winding for each pole of the primary or main winding of the motor. Thus, the alteration in flux caused by the secondary is equally divided over the poles of the main windings. If this is not done, and the alteration is concentrated on one or more asymmetrical poles, a consequent magnetic unbalance in the motor is apt to produce undesirable noise. Since the present device shows two poles, the use of two secondary windings produces a symmetrical division of the secondary. While improvement results from the division of the secondary among symmetrical poles over a division asymmetrically, it is found most desirable to divide the secondary among all the poles of the windings. As a matter of fact, however, any division will reduce the intensity of the unbalance, and consequently reduce the noise.

It is, therefore, evident that, if the motor is completely blocked, the switch 20 will open because of the excess current in the main windings and the heat produced in the heater 38 by such excess current. Likewise, should at any time the heat generated within the motor casing for any reason exceed this predetermined value, the switch 20 will open. Since this switch opens the main line to the windings of the motor, the motor will automatically be stopped.

In the modification shown in Fig. 2, motor terminals are shown at 50 and 51 on the walls of a motor casing 52. The remainder of the motor casing is represented by the broken line 52' which surrounds the to be described elements, thereby indicating said elements are within the motor casing 52. Within the motor casing and from the terminal 50 extends a lead 53 to a junction point 54. From this junction point 54 extends the main winding 55, a small portion of which is separately designated 56 for reasons to be described. From this winding extends a line 57 to a junction 58, from which junction it continues by way of line 59 through a switch 60 and a line 61 back to the other terminal 51. The switch 60 is, in all respects, identical with the switch 20.

Likewise, from the junction 54 is led the starting winding circuit in parallel with the main winding circuit. In this circuit is the starting winding 64 from which a line 66 extends to a condenser 67. From this condenser, a line 68 connects to a pole 69 of a two-pole centrifugal switch 70. From this switch, a line 71 connects to the junction 58 so that the starting circuit closes through the switch 60 to the terminal 51.

Tapped into the main windings, at some suitable point 73, dividing the section 56 aforesaid, is a lead 77 passing through a heating element 78 actuating the switch 60 and, by way of a line 79, to the other pole 80 of the centrifugal switch. A switch backing plate is shown at 81.

In the operation of this modification, the principles are the same as that of Fig. 1, since both comprise inductance circuits by means of which a certain variable but always low current may flow through the heating elements 38 and 78. Furthermore, the amount of this current in Fig. 2, similarly to Fig. 1, varies with the amount of current flowing in the main windings. Whereas Fig. 1 shows a full transformer, Fig. 2 shows an auto-transformer. In Fig. 2, the current flowing in the auto-transformer circuit is much less than that flowing in the main winding, by virtue of the small number of coils in the portion 56. Hence, only a small effect is produced on the main winding by the action of the auto-transformer.

The general operation of this circuit then is identical with that of the circuit of Fig. 1 and need not be described in further detail. Both circuits include a heater operable on low voltage and both act to open their respective switches when the current flowing in the main or the main and starting windings is excessive to a point of danger. Likewise, in both cases, the switches will open when the ambient temperatures within the motor casing exceed this critical value.

By connecting the heater to be energized off the main winding, the switch will be opened if the starting winding circuit is broken, such as might occur upon failure of the condenser 27 (or 67). In such case, if the motor switch is closed, and the phase circuit does not energize, the motor cannot start, and a high current will flow in the main windings. The presence of the switch as described will prevent damage to the main winding by opening the circuit in a very short period of time.

What is claimed is:

1. In combination with a motor having main and starting windings, a circuit for said main windings, a circuit for said starting windings, means joining said circuits comprising a pair of lines adapted for connection to a power source, a heater element, means connecting said heater element to said main winding circuit so that there is induced from said main windings as a primary through said heater element a potential producing a current proportional to that in said main winding, means for deenergizing said starting winding and said heater element when the motor attains a desired speed of operation, and a switch in one of said power lines actuatable by said heater element.

2. In combination with an electric motor having starting and running windings, a thermally-actuatable switch for controlling said motor mounted within the motor casing in heat-receiving relation to the windings, and a heater element located in heat-transferring relation to the switch connected in auto-transformer circuit with the main windings to receive current produced by the back E. M. F. of said windings and through a terminal of a centrifugal switch, which is in series with the starting winding, for energization during the starting of the motor, said heater being adapted to effect opening of the thermally-actuable switch during starting of the motor when an abnormal line current is supplied to the motor circuits.

VICTOR WEBER.